(12) United States Patent
Choi et al.

(10) Patent No.: US 10,378,430 B2
(45) Date of Patent: Aug. 13, 2019

(54) ENGINE SYSTEM HAVING INTEGRATED INTERCOOLER

(71) Applicants: Hyundai Motor Company, Seoul (KR); Kia Motors Corporation, Seoul (KR)

(72) Inventors: Won Rok Choi, Whasung-Si (KR); Seung Jae Kang, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 142 days.

(21) Appl. No.: 15/793,823

(22) Filed: Oct. 25, 2017

(65) Prior Publication Data

US 2018/0328264 A1   Nov. 15, 2018

(30) Foreign Application Priority Data

May 11, 2017 (KR) .......... 10-2017-0058624

(51) Int. Cl.
*F02B 29/04* (2006.01)
*F01P 1/08* (2006.01)
(Continued)

(52) U.S. Cl.
CPC ............ *F02B 29/0475* (2013.01); *F01P 3/14* (2013.01); *F02B 29/0437* (2013.01);
(Continued)

(58) Field of Classification Search
CPC .............. F02B 29/0475; F02B 29/0437; F02B 29/045; F02B 29/0462; F02B 47/08; F02B 47/10; F02D 41/005; F02D 41/0052; F02D 41/0007; F02D 2041/0017; F01P 1/08; F01P 2060/02; F01P 2060/12; F28D 7/16; F28D 21/0003; F28F 27/02; F28F 2250/06; F02M 26/24; F02M 26/17
See application file for complete search history.

(56) References Cited

U.S. PATENT DOCUMENTS 5,732,688 A * 3/1998 Charlton ................. F02D 21/08
123/568.12
7,793,498 B2 * 9/2010 Cook .................. F02B 29/0475
123/568.12
(Continued)

FOREIGN PATENT DOCUMENTS

JP    2001-152861 A   6/2001
JP    2014-148957 A   8/2014
(Continued)

*Primary Examiner* — Grant Moubry
(74) *Attorney, Agent, or Firm* — Morgan, Lewis & Bockius LLP

(57) ABSTRACT

An integrated intercooler apparatus, which is supplied with intake air and recirculating exhaust gas, and cools the intake air and the recirculating exhaust gas, may include: a heat exchanger in which gas passageways through which the intake air and the recirculating exhaust gas pass and coolant passageways through which a coolant passes are alternately formed from a front side to a rear side thereof; and a variable device which controls an area of an exhaust gas supply region and an area of an intake air supply region at a front side of an inlet side of the heat exchanger.

16 Claims, 6 Drawing Sheets

(51) Int. Cl.
*F02D 41/00* (2006.01)
*F01P 3/14* (2006.01)
*F28F 27/02* (2006.01)
*F02M 26/24* (2016.01)
*F28D 7/16* (2006.01)
*F28D 21/00* (2006.01)

(52) U.S. Cl.
CPC ....... *F02D 41/005* (2013.01); *F02D 41/0007* (2013.01); *F02D 41/0052* (2013.01); *F02M 26/24* (2016.02); *F28D 7/16* (2013.01); *F28D 21/0003* (2013.01); *F28F 27/02* (2013.01); *F01P 1/08* (2013.01); *F01P 2060/02* (2013.01); *F01P 2060/12* (2013.01); *F02D 2041/0017* (2013.01); *F28F 2250/06* (2013.01)

(56) References Cited

U.S. PATENT DOCUMENTS

| | | | | |
|---|---|---|---|---|
| 8,051,841 B2 * | 11/2011 | Pantow | ........... | F02M 35/10222 123/568.12 |
| 8,225,849 B2 * | 7/2012 | Hendrix | ........... | F02B 29/0418 123/568.12 |
| 8,316,805 B2 * | 11/2012 | Kardos | ........... | F01P 5/06 123/41.04 |
| 8,793,986 B2 * | 8/2014 | Caine | ........... | B60H 1/025 60/320 |
| 9,086,009 B2 * | 7/2015 | Mikame | ........... | F01P 3/202 |
| 9,169,809 B2 * | 10/2015 | Buckland | ........... | F02D 23/00 |
| 10,100,716 B2 * | 10/2018 | Choi | ........... | F02M 26/02 |
| 2005/0269062 A1 * | 12/2005 | Guerrero | ........... | F28D 1/0452 165/101 |
| 2007/0261400 A1 * | 11/2007 | Digele | ........... | F01N 3/05 60/320 |
| 2017/0335805 A1 * | 11/2017 | Zhang | ........... | F01P 3/20 |
| 2018/0274498 A1 * | 9/2018 | Rousseau | ........... | F02M 26/02 |

FOREIGN PATENT DOCUMENTS

| | | | | |
|---|---|---|---|---|
| KR | 10-2012-0011565 A | | 2/2012 | |
| KR | 10-2016-0031855 A | | 3/2016 | |
| WO | WO-2017053390 A1 * | | 3/2017 | ............. F02M 26/02 |

* cited by examiner

ENGINE SYSTEM HAVING INTEGRATED INTERCOOLER

CROSS-REFERENCE TO RELATED APPLICATION

The present application claims priority to Korean Patent Application No. 10-2017-0058624 filed on May 11, 2017, the entire contents of which is incorporated herein for all purposes by this reference.

BACKGROUND OF THE INVENTION

Field of the Invention

The present invention relates to an engine system having an integrated intercooler configured for cooling recirculating exhaust gas and compressed intake air and changing capacities for cooling intake air and recirculating exhaust gas.

Description of Related Art

In general, an engine has an exhaust gas recirculation (EGR) system that recirculates a portion of exhaust gas back to an intake line to lower a maximum temperature during combustion, inhibiting the occurrence of NOx.

A target air amount for each operation portion is set to the engine, an EGR gas (recirculating exhaust gas) amount and an amount of introduced intake air are adjusted by controlling an EGR duty ratio, the EGR gas amount is determined in advance for each operation section, and the recirculating exhaust gas amount is adjusted by controlling an EGR valve in accordance with an actual operation region.

In addition, a turbocharger or a super charger is applied to an internal combustion engine to introduce a sufficient amount of intake air while an intake valve is opened, and the turbocharger and the super charger improve efficiency in charging a cylinder of the engine with air and increase an output.

A low-pressure EGR system includes an intake line which supplies fresh air to the engine, an exhaust line which is formed to discharge exhaust gas to the outside, a low-pressure EGR line which diverges from the exhaust line and is connected to the intake line such that the exhaust gas recirculates therethrough, a low-pressure EGR cooler which is configured in the low-pressure EGR line to cool the recirculating exhaust gas, and a low-pressure EGR valve which is disposed in the low-pressure EGR line and adjusts the amount of recirculating exhaust gas.

In addition, a high-pressure EGR system includes a high-pressure EGR line which delivers high-temperature and high-pressure exhaust gas, which is discharged from an exhaust manifold, to an intake manifold, a high-pressure EGR cooler which cools the high-temperature and high-pressure exhaust gas passing through the high-pressure EGR line, and a low-pressure EGR valve.

Meanwhile, an intercooler is disposed in the intake line to cool high-temperature and high-pressure intake air compressed by the turbocharger, and recently, a water-cooled intercooler is applied as the intercooler, such that a coolant circuit passing through the water-cooled intercooler and a coolant circuit passing through the high-pressure EGR cooler are required.

Furthermore, since the water-cooled intercooler and the high-pressure EGR cooler are provided, component costs may be increased, and a cooling capacity may be insufficient or excessive under a low-speed and low-load condition or a high-speed and high-load condition.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing an engine system having an integrated intercooler in which a high-pressure EGR cooler and a water-cooled intercooler are integrated into a single device, such that capacities for cooling high-pressure recirculating exhaust gas and intake air are controlled by use of the integrated intercooler, reducing component costs, reducing a space, and simplifying an entire cooling circuit.

Various aspects of the present invention are directed to providing an integrated intercooler which is supplied with intake air and recirculating exhaust gas, and cools the intake air and the recirculating exhaust gas, the integrated intercooler including: a heat exchanger in which gas passageways through which the intake air and the recirculating exhaust gas pass and coolant passageways through which a coolant passes are alternately formed from a front side to a rear side; and a variable device which controls an area of an exhaust gas supply region and an area of an intake air supply region at a front side of an inlet side of the heat exchanger.

The variable device may include: an inlet conical portion which forms an inlet space into which the intake air and the recirculating exhaust gas are supplied, and is fastened along an external circumference of the front side of the heat exchanger; a separation wall which is mounted in the inlet conical portion, and divides the inlet space into a first inlet space into which the recirculating exhaust gas is supplied, and a second inlet space into which the intake air is supplied; and an actuator which changes the exhaust gas supply region and the intake air supply region by pulling or pushing one side of the separation wall through a rod.

The separation wall may include: a movable plate which is disposed at the front side of the heat exchanger and disposed to be reciprocally movable by the actuator through the rod; a fixed member which is disposed in the inlet space of the inlet conical portion at a predetermined distance from the movable plate; and a link mechanism which connects the fixed member and the movable plate, and divides the inlet space into the first and second inlet spaces.

The link mechanism may include: a hinge link which has a tip portion connected to the fixed member through a hinge; and a variable link which has a rear end portion connected to the movable plate through a hinge, and a tip portion coupled to the hinge link through a pin.

A slot may be formed in one of the portions where the variable link and the hinge link are connected to each other, and a pin inserted into the slot may connect the variable link and the hinge link.

The integrated intercooler may include an outlet conical portion which is fastened along an external circumference of a rear side of the heat exchanger, and forms an outlet space through which the intake air and the recirculating exhaust gas are mixed and discharged.

One side and the other side of the coolant passageway may be connected to a coolant supply line and a coolant discharge line, respectively.

Various aspects of the present invention are directed to providing an engine system having an integrated intercooler which is supplied, from one side, with intake air compressed by a compressor and recirculating exhaust gas which are recirculated, cools the intake air and the recirculating exhaust gas, and supplies the intake air and the recirculating exhaust gas to an engine, the integrated intercooler including: a heat exchanger in which gas passageways through which the intake air and the recirculating exhaust gas pass and coolant passageways through which a coolant passes are alternately formed from a front side to a rear side; a variable device which controls an area of an exhaust gas supply region to which the recirculating exhaust gas is supplied and an area of an intake air supply region to which the intake air is supplied, at a front side of an inlet side of the heat exchanger; and a control device which controls the variable device based on a driving condition.

The variable device may include: an inlet conical portion which is fastened along an external circumference of the front side of the heat exchanger, and forms an inlet space into which the intake air and the recirculating exhaust gas are supplied; a separation wall which is mounted in the inlet conical portion, and divides the inlet space into a first inlet space into which the recirculating exhaust gas is supplied, and a second inlet space into which the intake air is supplied; and an actuator which simultaneously changes the exhaust gas supply region and the intake air supply region by pulling or pushing one side of the separation wall through a rod.

The separation wall may include: a movable plate which is disposed at the front side of the heat exchanger and disposed to be reciprocally movable by the actuator through the rod; a fixed member which is disposed in the inlet space of the inlet conical portion at a predetermined distance from the movable plate; and a link mechanism which connects the fixed member and the movable plate, and divides the inlet space into the first and second inlet spaces.

The link mechanism may include: a hinge link which has a tip portion connected to the fixed member through a hinge; and a variable link which has a rear end portion connected to the movable plate through a hinge, and a tip portion coupled to the hinge link through a pin.

A slot may be formed in one of the portions where the variable link and the hinge link are connected to each other, and a pin inserted into the slot may connect the variable link and the hinge link.

The compressor may be a turbocharger, and the turbocharger may include a turbine which is disposed in an exhaust line, and a compressor which compresses the intake air flowing through an intake line by the turbine.

One side of the inlet conical portion may be connected to a high-pressure EGR line through which high-pressure EGR gas discharged from an upstream side of the turbine flows.

The other side of the inlet conical portion may be connected to the intake line through which the intake air compressed by the compressor flows.

The control device may increase the exhaust gas supply region and decrease the intake air supply region by moving the movable plate in one direction by controlling the actuator when it is determined that the engine is operated under a low-speed and low-load condition, and may decrease the exhaust gas supply region and increase the intake air supply region by moving the movable plate in the other direction by controlling the actuator when it is determined that the engine is operated under a high-speed and high-load condition.

According to an exemplary embodiment of the present invention for achieving the aforementioned object, a capacity for cooling recirculating exhaust gas and a capacity for cooling intake air are changed by use of the actuator in accordance with the supply amount of the high-pressure recirculating exhaust gas and the supply amount of the intake air, improving cooling efficiency, and the two coolers are integrated into a single device, reducing the number of components, saving a space, and improving productivity.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
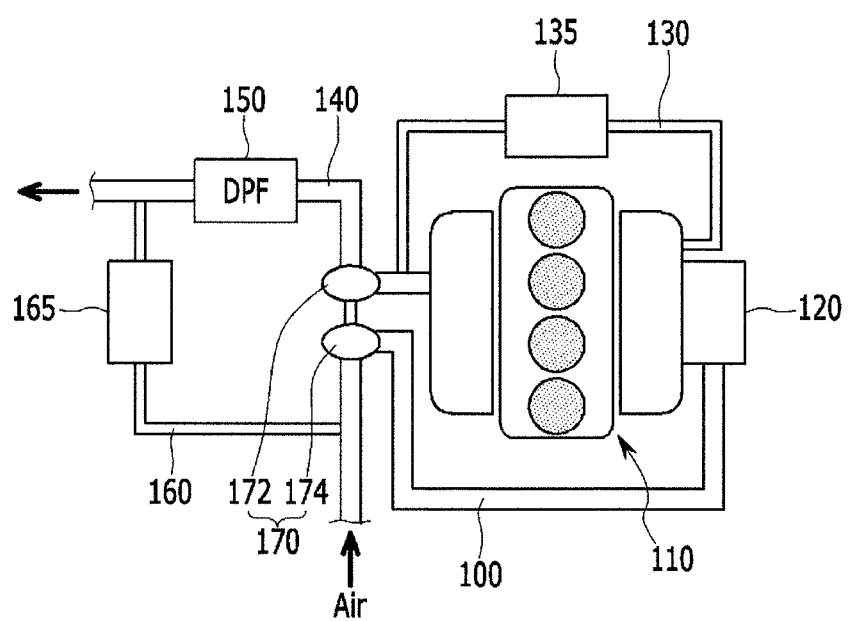
FIG. 1 is a schematic configuration view of an engine system having an EGR cooler related to the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The size and thickness of each component illustrated in the drawings are arbitrarily shown for understanding and ease of description, but the present invention is not limited thereto. Thicknesses of several portions and regions are enlarged for clearly describing the above.

Parts irrelevant to the description will be omitted to clearly describe the exemplary embodiments of the present invention, and the same or similar constituent elements will be designated by the same reference numerals throughout the specification.

In the following description, names of constituent elements are classified as a first . . . , a second . . . , and the like to discriminate the constituent elements having the same name, and the names are not essentially limited to the order.

In an exemplary embodiment of the present invention, recirculating exhaust gas may be referred to as exhaust gas recirculation (EGR).

FIG. 1 is a schematic configuration view of an engine system having an EGR cooler related to the present invention.

Referring to FIG. 1, the engine system includes, as constituent elements, an intake line 100, an engine 110, an intercooler 120, a high-pressure EGR line 130, a high-pressure EGR cooler 135, an exhaust line 140, a DPF 150, a low-pressure EGR line 160, a low-pressure EGR cooler 165, and a turbocharger 170. Here, the turbocharger 170 includes a turbine 172 and a compressor 174.

The compressor 174 and the intercooler 120 are disposed in the intake line 100, and the turbine 172 and the DPF 150 are disposed in the exhaust line 140.

The high-pressure EGR line 130 diverges from the exhaust line 140 at an upstream side of the turbine 172, and merges into an intake manifold of the engine 110, and the high-pressure EGR cooler 135 is disposed in the high-pressure EGR line 130.

The low-pressure EGR line 160 diverges from the exhaust line 140 at a downstream side of the DPF 150, and merges into an upstream side of the compressor 174, and the low-pressure EGR cooler 165 is disposed in the low-pressure EGR line 160.

Meanwhile, since the high-pressure EGR cooler 135 and the intercooler 120 are disposed, the number of components may be increased, and a mounting space and a weight may be increased.

Figure 2:
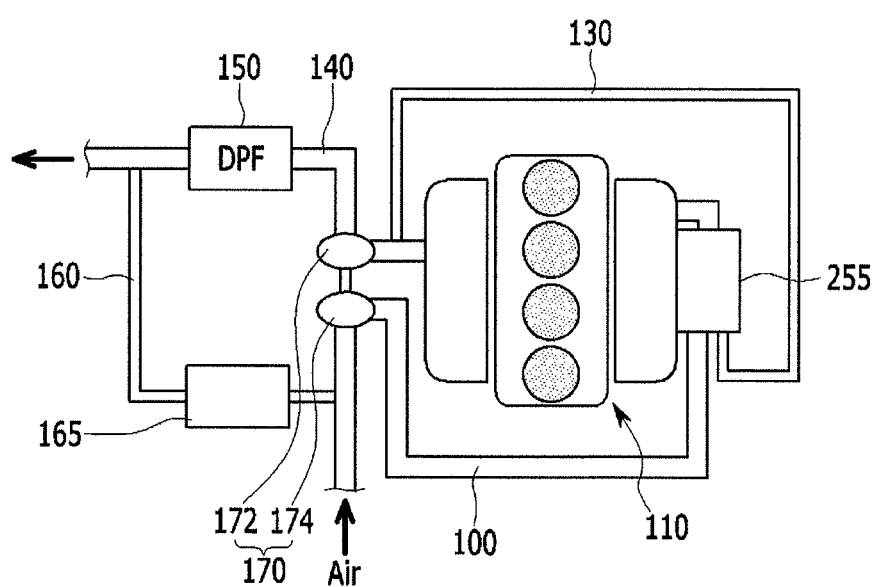
FIG. 2 is a schematic configuration view of an engine system having an integrated intercooler according to an exemplary embodiment of the present invention.

FIG. 2 is a schematic configuration view of an engine system having an integrated intercooler according to an exemplary embodiment of the present invention.

Referring to FIG. 2, the engine system having an integrated intercooler includes, as main constituent elements, an intake line 100, a turbocharger 170, an integrated intercooler 255, an engine 110, an exhaust line 140, a DPF 150, a low-pressure EGR line 160, a low-pressure EGR cooler 165, and a high-pressure EGR line 130. Here, the turbocharger 170 includes a turbine 172 and a compressor 174.

In the exemplary embodiment of the present invention, the integrated intercooler 255 is of a water-cooled type and cools compressed air passing through the intake line 100 and high-pressure recirculating exhaust gas passing through the high-pressure EGR line 130, and the cooled intake air and the cooled exhaust gas are mixed and supplied to the engine 110 through an intake manifold. Furthermore, the integrated intercooler 255 may include an aluminum material.

The engine 110 is supplied with the gas mixture of the intake air and the exhaust gas, compresses the gas mixture by use of a piston, injects fuel into the gas mixture and combusts the fuel, and generates rotational force by use of combustion pressure, and combustion gas is discharged to the exhaust line through an exhaust manifold.

The turbine 172 is rotated by exhaust gas and rotates the compressor 174, and the DPF 150 disposed in the exhaust line 140 traps particulate matters contained in the exhaust gas, reducing hazardous substances.

The low-pressure EGR cooler 165 is disposed in the low-pressure EGR line 160 to cool low-pressure recirculating exhaust gas, and an EGR valve may be disposed in the low-pressure EGR line 160.

Figure 3:
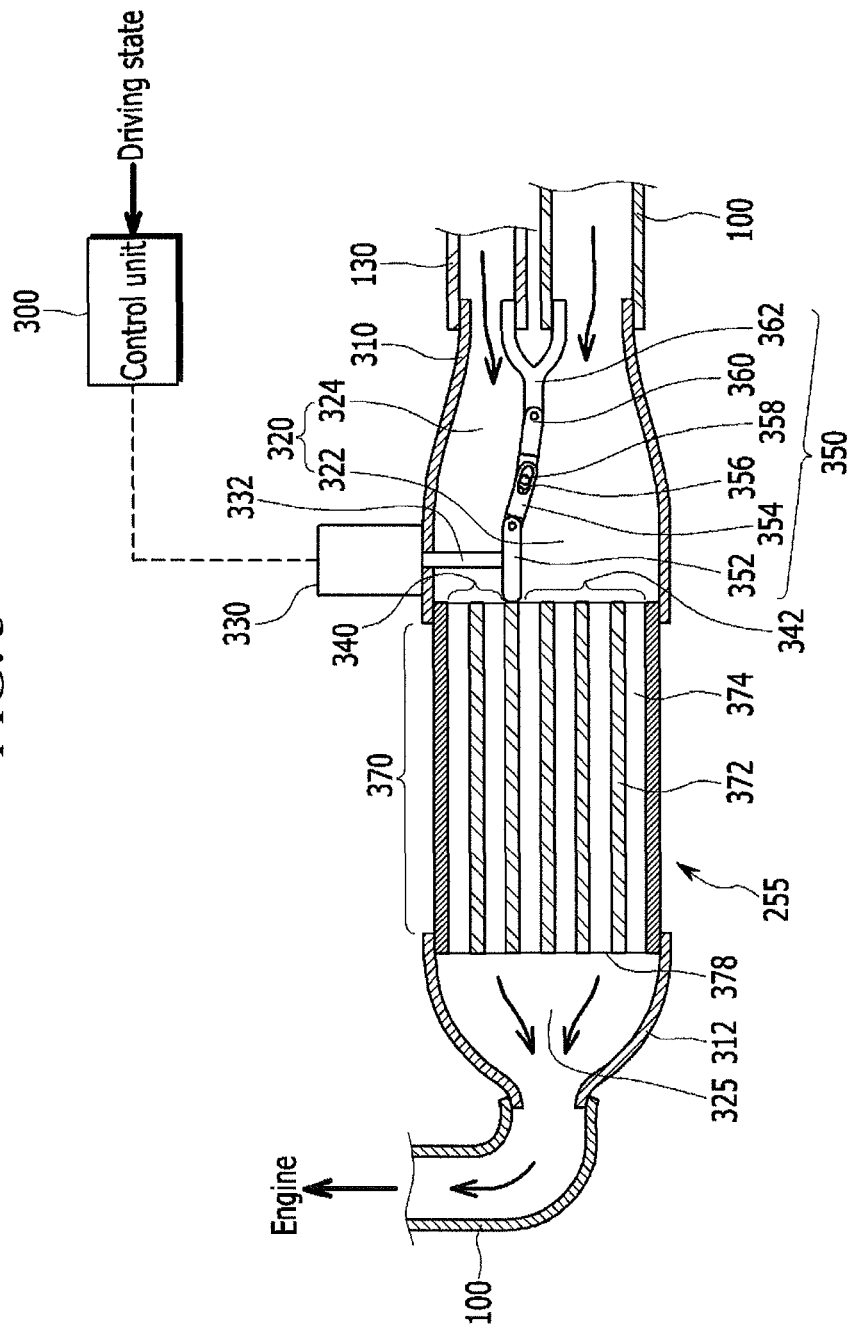
FIG. 3 is a schematic cross-sectional view of the integrated intercooler according to the exemplary embodiment of the present invention.

FIG. 3 is a schematic cross-sectional view of the integrated intercooler according to the exemplary embodiment of the present invention.

Referring to FIG. 3, the engine system includes, as main constituent elements, a control device 300 and the integrated intercooler 255, and the integrated intercooler 255 includes, as main constituent elements, an outlet space 325, an outlet conical portion 312, a rear side 378, coolant passageways 372, a front side 376, gas passageways 374, a separation wall 350, an inlet conical portion 310, an inlet space 320, a rod 332, an exhaust gas supply region 340, an intake air supply region 342, an actuator 330, and a heat exchanger 370.

Here, the inlet space 320 includes a first inlet space 322 and a second inlet space 324, and the separation wall 350 includes a movable plate 352, a variable link 354, a slot 356, a pin 358, a hinge link 360, and a fixed member 362.

The integrated intercooler 255 includes a heat exchanger, and the heat exchanger 370 has a structure in which the gas passageways 374 and the coolant passageways 372 are alternately formed from a bottom side to a top side. The recirculating exhaust gas or the intake air passes through the gas passageway 374, and a cooling coolant passes through the coolant passageway 372.

The heat exchanger 370 has the front side 376 and the rear side 378 formed at front and rear sides thereof, the gas passageway 374 is formed from the front side 376 to the rear side 378, the coolant passageway 372 is formed between the front side 376 and the rear side 378, the exhaust gas supply region 340 is formed at the front side 376 at an upper side based on the movable plate 352, and the intake air supply region 342 is formed at a lower side based on the movable plate 352.

The inlet conical portion 310 is mounted along an external circumference of the front side of the heat exchanger 370, the outlet conical portion 312 is mounted along an external circumference of the rear side of the heat exchanger 370, the inlet conical portion 310 forms the inlet space 320, and the outlet conical portion 312 forms the outlet space 325.

One side of the inlet conical portion 310 is connected to the high-pressure EGR line 130 and supplied with high-pressure recirculating exhaust gas, and the other side of the inlet conical portion 310 is connected to the intake line 100 and supplied with compressed air.

The inlet space 320 includes the first inlet space 322 which is supplied with the recirculating exhaust gas, and the second inlet space 324 which is supplied with the intake air, and the first and second inlet spaces 322 and 324 are divided vertically by the separation wall 350.

The separation wall 350 includes the movable plate 352 which is disposed at the front side of the heat exchanger 370, and the fixed member 362 which is disposed at a front center of the inlet conical portion 310, and the separation wall 350 includes the variable link 354 and the hinge link 360 which connect the movable plate 352 and the fixed member 362.

In more detail, a tip portion of the movable plate 352 is connected to the variable link 354 by a pin, a tip portion of the variable link 354 is connected to the hinge link 360 by the slot 356 and the pin 358, and the hinge link 360 is connected to a rear end portion of the fixed member 362 by a pin.

Here, the slot 356 is formed in a tip portion of the variable link 354, and the pin 358 inserted into the slot 356 is connected to a tip portion of the hinge link 360, connecting the variable link 354 and the hinge link 360.

The actuator 330 is fixedly disposed at an upper external side of the inlet conical portion 310 to correspond to the movable plate 352, and the actuator 330 may pull the movable plate 352 upward or push the movable plate 352 downward through the rod 332.

The control device 300 determines or selects the supply amount of the high-pressure recirculating exhaust gas and the supply amount of the intake air in accordance with a driving condition, and the control device 300 controls the actuator 330 based on the determined or selected supply amount of the high-pressure recirculating exhaust gas and the determined or selected supply amount of the intake air, controlling a vertical position of the movable plate 352.

In general, the smaller the supply amount of the high-pressure recirculating exhaust gas, the larger the supply amount of the intake air, and the larger the supply amount of the high-pressure recirculating exhaust gas, the smaller the supply amount of the intake air.

In the exemplary embodiment of the present invention, a capacity for cooling recirculating exhaust gas and a capacity for cooling intake air are changed by controlling a position of the movable plate 352 by use of the actuator 330 in accordance with the supply amount of the high-pressure recirculating exhaust gas and the supply amount of the intake air, improving cooling efficiency, and the two coolers are integrated into a single device, reducing the number of components, saving a space, and improving productivity.

Figure 4:
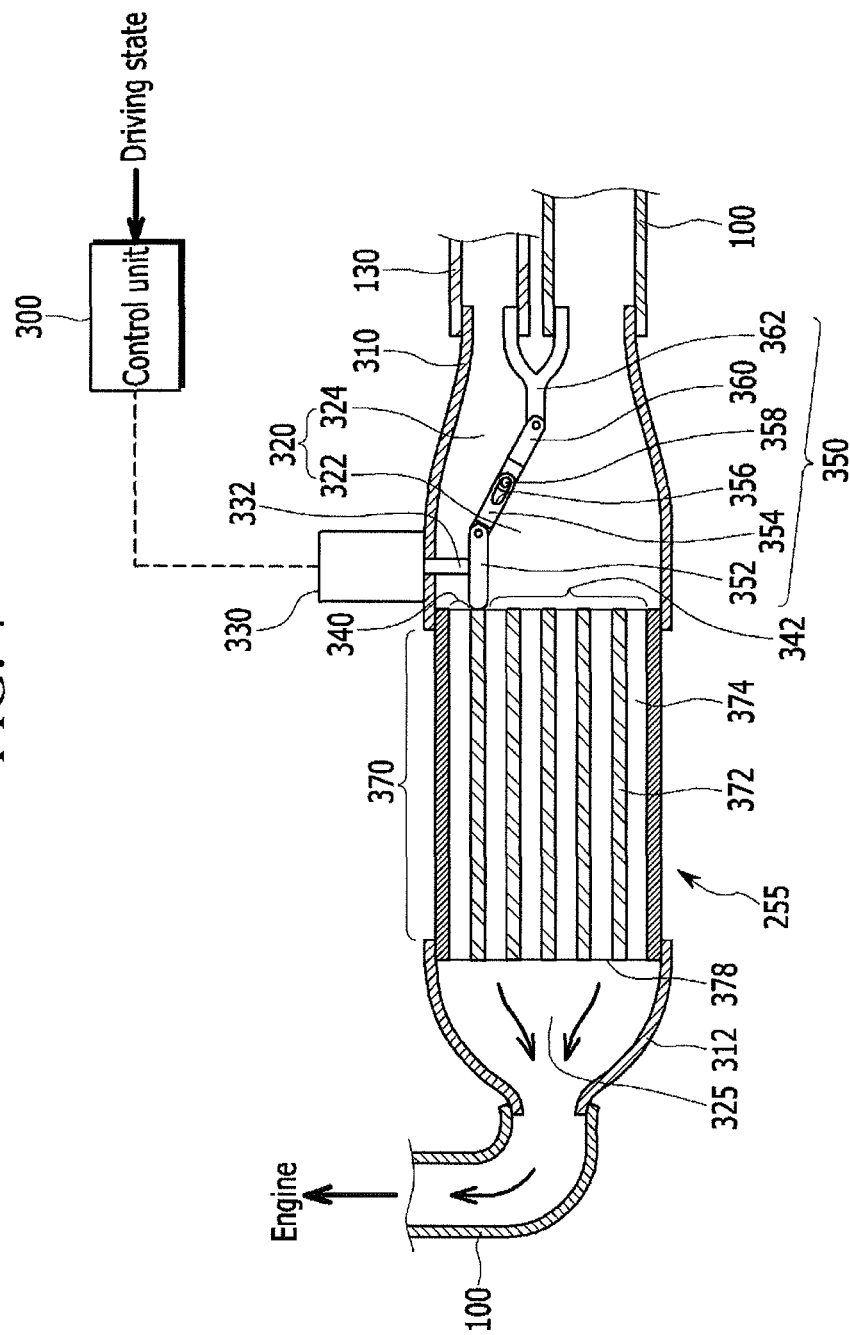
FIG. 4 is a schematic cross-sectional view illustrating a state of a first driving mode of the integrated intercooler according to the exemplary embodiment of the present invention.

FIG. 4 is a schematic cross-sectional view illustrating a state of a first driving mode of the integrated intercooler according to the exemplary embodiment of the present invention.

Referring to FIG. 4, based on driving states (a rotation speed, a load, etc.) of the engine, under a high-speed and high-load condition, the control device 300 controls the actuator 330, and the actuator 330 pulls the movable plate 352 upward by a predetermined distance through the rod 332.

Therefore, the exhaust gas supply region 340 is decreased, and the intake air supply region 342 is increased. Therefore, a capacity for cooling the high-pressure recirculating exhaust gas is decreased, and a capacity for cooling the intake air is increased.

Here, a distance between the movable plate 352 and the fixed member 362 is changed by the structure of the slot 356 and the pin 358.

Figure 5:
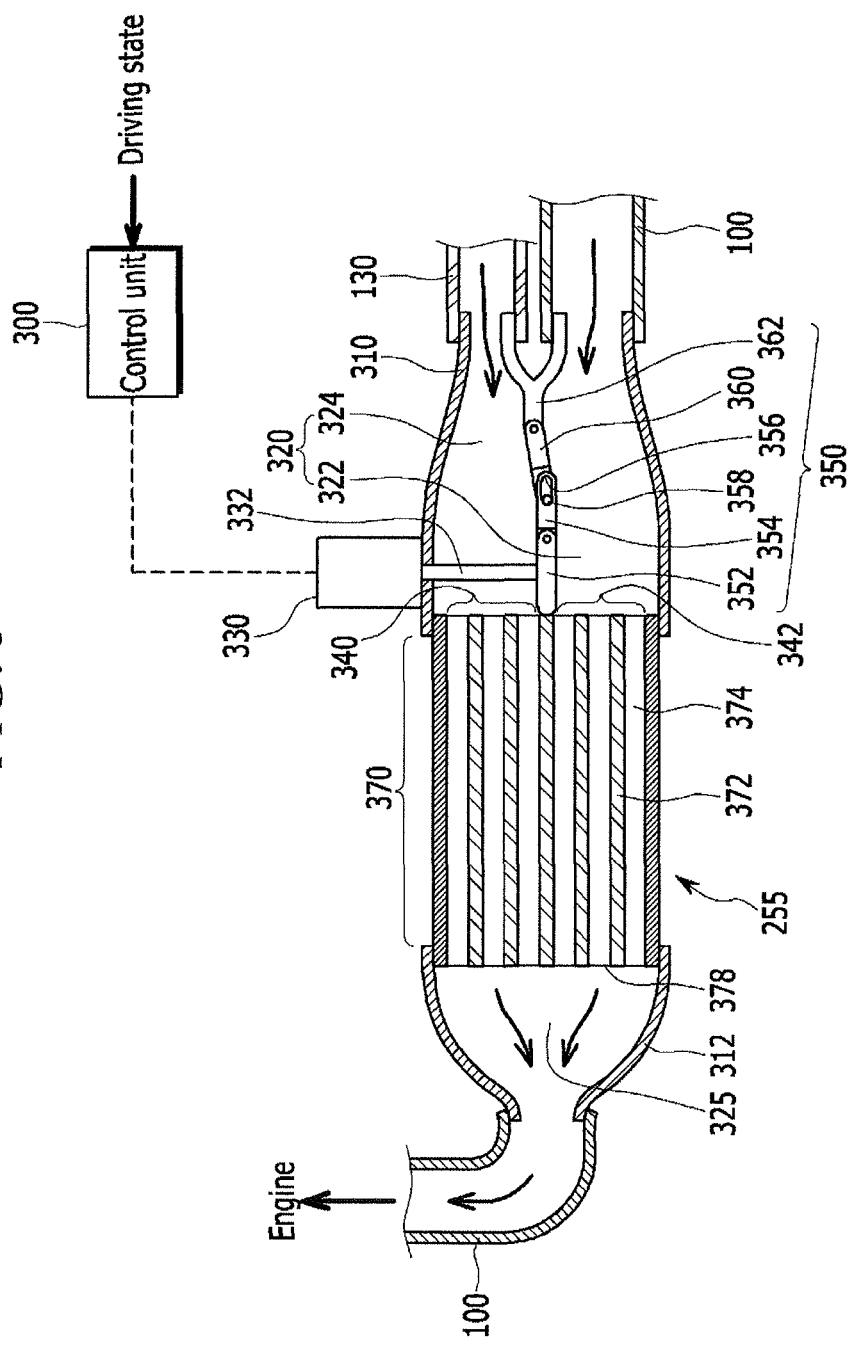
FIG. 5 is a schematic cross-sectional view illustrating a state of a second driving mode of the integrated intercooler according to the exemplary embodiment of the present invention.

FIG. 5 is a schematic cross-sectional view illustrating a state of a second driving mode of the integrated intercooler according to the exemplary embodiment of the present invention.

Referring to FIG. 5, based on the driving states (a rotation speed, a load, etc.) of the engine, under a low-speed and low-load condition, the control device 300 controls the actuator 330, and the actuator 330 pushes the movable plate 352 downward through the rod 332.

Therefore, the exhaust gas supply region 340 is increased, and the intake air supply region 342 is decreased. Therefore, a capacity for cooling the high-pressure recirculating exhaust gas is increased, and a capacity for cooling the intake air is decreased.

Here, a distance between the movable plate 352 and the fixed member 362 is changed by the structure of the slot 356 and the pin 358.

Figure 6:
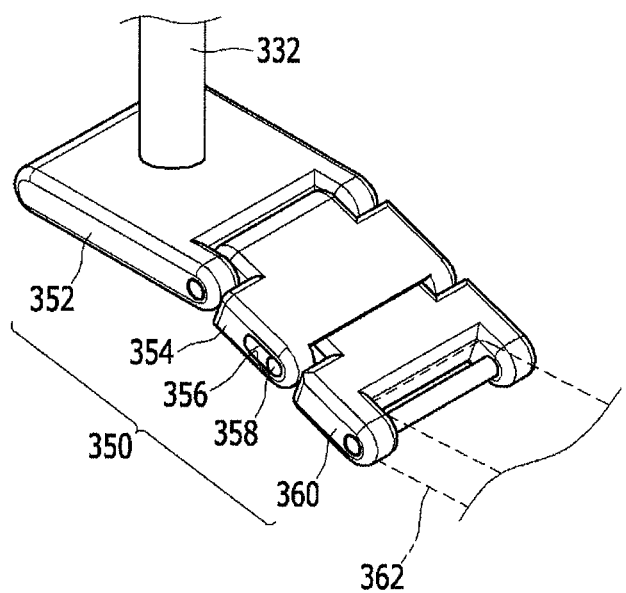
FIG. 6 is a partial perspective view illustrating an operating portion of the integrated intercooler according to the exemplary embodiment of the present invention.

FIG. 6 is a partial perspective view illustrating an operating portion of the integrated intercooler according to the exemplary embodiment of the present invention.

Referring to FIG. 6, the separation wall 350 includes the movable plate 352, the variable link 354, the hinge link 360, and the fixed member 362.

As illustrated in FIG. 3, one side of the tip portion of the fixed member 362 is connected to the high-pressure EGR line 130, and the other side of the tip portion of the fixed member 362 is connected to the intake line 100.

The rear end portion of the fixed member 362 is connected to the hinge link 360, and the hinge link 360 is disposed to be rotatable about the rear end portion of the fixed member 362.

A rear end portion of the movable plate 352 corresponds to the front side of the heat exchanger 370, the tip portion of the movable plate 352 is connected to a rear end portion of the variable link 354, and the rear end portion of the variable link 354 is disposed to be rotatable about the tip portion of the movable plate 352.

The variable link 354 and the hinge link 360 are connected through the slot 356 and the pin 358, the slot 356 is formed in the tip portion of the variable link 354, and the pin 358 is inserted into the slot 356 and the hinge link 360, connecting the hinge link 360 and the variable link 354.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated intercooler apparatus which is supplied with intake air and recirculating exhaust gas, and cools the intake air and the recirculating exhaust gas, the integrated intercooler apparatus comprising:
   a heat exchanger in which gas passageways through which the intake air and the recirculating exhaust gas pass and coolant passageways through which a coolant passes are alternately formed from a first side to a second side of an intake manifold; and
   a variable device which controls an area of an exhaust gas supply region and an area of an intake air supply region at a front side of an inlet side of the heat exchanger.

2. The integrated intercooler apparatus of claim 1, wherein
   the variable device includes:
   an inlet conical portion which forms an inlet space into which the intake air and the recirculating exhaust gas are supplied, and is fastened along an external circumference of the front side of the heat exchanger;

a separation wall which is mounted in the inlet conical portion, and divides the inlet space into a first inlet space into which the recirculating exhaust gas is supplied, and a second inlet space into which the intake air is supplied; and an actuator which changes the exhaust gas supply region and the intake air supply region by pulling or pushing a side of the separation wall through a rod.

3. The integrated intercooler apparatus of claim 2, wherein
the separation wall includes:
a movable plate which is disposed at the front side of the heat exchanger and disposed to be reciprocally movable by the actuator through the rod;
a fixed member which is disposed in the inlet space of the inlet conical portion at a predetermined distance from the movable plate; and
a link mechanism which connects the fixed member and the movable plate, and divides the inlet space into the first and second inlet spaces.

4. The integrated intercooler apparatus of claim 3, wherein
the link mechanism includes:
a hinge link which has a tip portion connected to the fixed member through a hinge; and
a variable link which has a rear end portion connected to the movable plate through a hinge, and a tip portion coupled to the hinge link through a pin.

5. The integrated intercooler apparatus of claim 4, wherein
a slot is formed in one of the portions where the variable link and the hinge link are connected to each other, and
a pin inserted into the slot connects the variable link and the hinge link.

6. The integrated intercooler apparatus of claim 1, including:
an outlet conical portion which is fastened along an external circumference of a rear side of the heat exchanger, and forms an outlet space through which the intake air and the recirculating exhaust gas are mixed and discharged.

7. The integrated intercooler apparatus of claim 1, wherein
a first side and a second side of the coolant passageway are connected to a coolant supply line and a coolant discharge line, respectively.

8. An engine system having an integrated intercooler apparatus which is supplied, from one side thereof, with intake air compressed by a compressor and recirculating exhaust gas which are recirculated, cools the intake air and the recirculating exhaust gas, and supplies the intake air and the recirculating exhaust gas to an engine,
the integrated intercooler apparatus including:
a heat exchanger in which gas passageways through which the intake air and the recirculating exhaust gas pass and coolant passageways through which a coolant passes are alternately formed from a front side to a rear side thereof;
a variable device which controls an area of an exhaust gas supply region to which the recirculating exhaust gas is supplied and an area of an intake air supply region to which the intake air is supplied, at a front side of an inlet side of the heat exchanger; and
a controller which is configured to control the variable device based on a driving condition.

9. The engine system of claim 8, wherein
the variable device includes:
an inlet conical portion which is fastened along an external circumference of the front side of the heat exchanger, and forms an inlet space into which the intake air and the recirculating exhaust gas are supplied;
a separation wall which is mounted in the inlet conical portion, and divides the inlet space into a first inlet space into which the recirculating exhaust gas is supplied, and a second inlet space into which the intake air is supplied; and
an actuator which changes the exhaust gas supply region and the intake air supply region by pulling or pushing a side of the separation wall through a rod.

10. The engine system of claim 9, wherein
the separation wall includes:
a movable plate which is disposed at the front side of the heat exchanger and disposed to be reciprocally movable by the actuator through the rod;
a fixed member which is disposed in the inlet space of the inlet conical portion at a predetermined distance from the movable plate; and
a link mechanism which connects the fixed member and the movable plate, and divides the inlet space into the first and second inlet spaces.

11. The engine system of claim 10, wherein
the link mechanism includes:
a hinge link which has a tip portion connected to the fixed member through a hinge; and
a variable link which has a rear end portion connected to the movable plate through a hinge, and a tip portion coupled to the hinge link through a pin.

12. The engine system of claim 11, wherein
a slot is formed in one of the portions where the variable link and the hinge link are connected to each other, and
a pin inserted into the slot connects the variable link and the hinge link.

13. The engine system of claim 9, wherein
the compressor is a turbocharger, and
the turbocharger includes a turbine which is disposed in an exhaust line, and a compressor which compresses the intake air flowing through an intake line by the turbine.

14. The engine system of claim 13, wherein
a first side of the inlet conical portion is connected to an EGR line through which EGR gas is discharged from an upstream side of the turbine flows.

15. The engine system of claim 13, wherein
a second side of the inlet conical portion is connected to the intake line through which the intake air is compressed by the compressor flows.

16. The engine system of claim 10, wherein
the control unit increases the exhaust gas supply region and decreases the intake air supply region by moving the movable plate in a first direction by controlling the actuator when the controller determines that the engine is operated under a speed lower than a predetermined speed and a load lower than a predetermined load, and
the control unit decreases the exhaust gas supply region and increases the intake air supply region by moving the movable plate in a second direction by controlling the actuator when the controller determines that the engine is operated under a speed higher than a predetermined speed and a load higher than predetermined load.

* * * * *